United States Patent [19]

Fukuda et al.

[11] Patent Number: 4,970,608
[45] Date of Patent: Nov. 13, 1990

[54] EDITING SYSTEM FOR REARRANGING ALOCATION OF INFORMATION UNITS ON AN INFORMATION RECORDING MEDIUM

[75] Inventors: Yoshio Fukuda, Hino; Hiroyuki Watanabe, Yokohama; Tetsuya Kawasaki, Tatsuno; Yasuo Arisawa, Okaya; Masayuki Murashita, Tokyo, all of Japan

[73] Assignee: Olympus Optical Co., Ltd., Tokyo, Japan

[21] Appl. No.: 324,579

[22] Filed: Mar. 16, 1989

[30] Foreign Application Priority Data

Mar. 18, 1988 [JP] Japan .................................. 63-65395
Mar. 18, 1988 [JP] Japan .................................. 63-65396
Mar. 18, 1988 [JP] Japan .................................. 63-65397

[51] Int. Cl.⁵ ........................................... H04N 5/781
[52] U.S. Cl. ............................................... 360/14.1
[58] Field of Search ............... 358/906, 909, 335, 342; 360/72.1, 72.3, 14.1, 14.3, 33.1, 35.1, 31, 15, 66, 14.2, 13; 369/83, 53, 84

[56] References Cited

U.S. PATENT DOCUMENTS

| | | | |
|---|---|---|---|
| 4,348,698 | 9/1982 | Schomann | 360/14.1 |
| 4,520,405 | 5/1985 | Sasaki et al. | 360/14.1 |
| 4,591,930 | 5/1986 | Baumeister | 360/66 |
| 4,660,102 | 4/1987 | Kawakami et al. | 360/14.1 |
| 4,740,846 | 4/1988 | Ogawa | 360/66 |
| 4,746,992 | 5/1988 | Hashimoto et al. | 358/310 |
| 4,772,938 | 9/1988 | Sasson | 358/21 |
| 4,777,537 | 10/1988 | Ueno et al. | 358/341 |
| 4,782,403 | 11/1988 | Hasegawa et al. | 360/14.1 |
| 4,825,324 | 4/1989 | Miyake et al. | 360/35.1 |
| 4,837,638 | 6/1989 | Fullwood | 360/14.3 |

FOREIGN PATENT DOCUMENTS

| | | |
|---|---|---|
| 47-32721 | 11/1972 | Japan . |
| 47-32722 | 11/1972 | Japan . |
| 47-32723 | 11/1972 | Japan . |
| 52-67309 | 6/1977 | Japan . |
| 55-3243 | 1/1980 | Japan . |
| 57-58275 | 4/1982 | Japan . |
| 58-224484 | 12/1983 | Japan . |
| 59-8181 | 1/1984 | Japan . |
| 59-8182 | 1/1984 | Japan . |
| 59-14181 | 1/1984 | Japan . |
| 59-14182 | 1/1984 | Japan . |
| 60-143081 | 7/1985 | Japan . |
| 61-18276 | 1/1986 | Japan . |
| 61-18277 | 1/1986 | Japan . |
| 61-18278 | 1/1986 | Japan . |
| 61-18289 | 1/1986 | Japan . |
| 61-65592 | 4/1986 | Japan . |
| 61-95691 | 5/1986 | Japan . |
| 61-202336 | 9/1986 | Japan . |
| 61-269227 | 11/1986 | Japan . |
| 62-67386 | 4/1987 | Japan . |
| 62-114386 | 5/1987 | Japan . |
| 62-202332 | 9/1987 | Japan . |
| 63-1661 | 1/1988 | Japan . |

Primary Examiner—Donald McElheny, Jr.
Attorney, Agent, or Firm—Kenyon & Kenyon

[57] ABSTRACT

An editing system, an embodiment of which is a still video floppy disk system, including a temporary storage means for evacuating recorded information in a track of a floppy disk before the track is placed under erasing operation. Utilizing the temporary storage means, self-editing operation in a regular sequence is performed so as to rearrange or relocate recorded tracks in such a manner that the recorded tracks are consecutively allocated from the outer side of the disk without including unrecorded tracks. No system other than a single self-editing system of the invention is necessary to perform the self-editing operation.

14 Claims, 7 Drawing Sheets

EDITING SYSTEM FOR REARRANGING ALOCATION OF INFORMATION UNITS ON AN INFORMATION RECORDING MEDIUM

BACKGROUND OF THE INVENTION

1. Field of the Invention

This invention relates to a system for editing information recorded on a recording medium such as a magnetic disk, and more particularly to a system for editing units of information, for example, units of field picture information, within a recording surface of a recording medium applied thereto.

2. Description of the Related Art

In recent years, information recording and/or reproducing systems, such as an electronic still camera, for recording information units, for instance, fields of color video information, in successive recording areas, that is, successive recording tracks allocated on a recording medium, have been developed (see Japanese Published Patent Application, Publication No. 63-1661). In such a system, information units recorded in the successive recording areas may be selectively erased arbitrarily. On the other hand, information units may be skippingly recorded in the recording areas without following a regular order such as from the most outer track (i.e., the first track) to the most inner track (i.e., the n-th track), skipping over certain recording areas, which remain unrecorded. As a result of selectively erasing or skippingly recording information as aforementioned, recorded areas and unrecorded areas are scatteringly located on the information recording medium. If the information recorded areas are scattered on a recording medium applied to such a recording and/or reproducing system, a pickup head means or a reproducing means must skippingly scan the recording areas where information is recorded, for promptly producing the successive information units without noise caused by executing reproduction for the unrecorded areas. Therefore, a driving means for the pickup head means or the reproducing means must be complicated. Further, a means for detecting unrecorded areas, that is, detecting the remaining capacity of the recording medium must be complicated.

On the other hand, a recording and/or reproducing apparatus using a rotary magnetic disk as the information recording medium has a problem that information recording and/or reproducing characteristics gradually deteriorate from the outer recording tracks to the inner recording tracks because the relative speed of the pickup head means with respect to the rotary magnetic disk is lower at the inner tracks. Thus, in this system, if the information recorded in the inner tracks is once reproduced and recorded in other inner tracks, the quality of information remarkably deteriorates.

Now, video information recording and/or reproducing apparatus adapted to process multiplexed video information inclusive of picture information and supplementary information associated with the picture information, such as the track number, date or any data information, are developing, and particularly standard specification of such apparatus has been proposed as "SPECIFICATION OF STILL VIDEO FLOPPY DISC SYSTEMS" by EIAJ (Electronic Industries Association of Japan). In such a system, it is desired that the supplementary data associated with the picture information may be modified or revised corresponding to the rearrangement of the location of the areas for the picture information to be recorded therein. A system, which is capable of simultaneously rearranging the picture information and modifying the associated data information with both kinds of information maintained in the multiplexed video information form, will be complicated.

SUMMARY OF THE INVENTION

According to the present invention, there is provided a self-editing system including a temporary storage means which solves these problems. The temporary storage means is provided in this self-editing system separately from an information recording medium which may be detachably applied to the system. Further, a system control means is provided in this system so as to provide a regular sequence for an editing operation of this system, in proper steps of which sequence the control means drives the temporary storage means so as to evacuate information from a recording area on the recording medium where the information has been recorded.

According to an aspect of the invention, information units formerly recorded on the recording medium can be positionally rearranged automatically within the same recording medium applied to this system itself. Thus, the self-editing system of this invention is essentially distinct from conventional editing or dubbing systems based on the premise that both systems for reproduction and for recording, to which an information recording medium is applied respectively, are to be jointly used for editing or dubbing.

According to another aspect of the invention, scatteringly located information recorded areas on the recording medium can be positionally rearranged so that the information recorded areas are collectively or consecutively allocated to exclude the unrecorded areas from the collective or consecutive recorded areas.

According to still another aspect of the invention, the rearranging operation for the information recorded areas may be executed maintaining the recording order formerly allocated on the recording medium, or without remarkable deterioration of recorded information caused by the rearranging operation.

According to still another aspect of the invention, supplementary data associated with principal information (e.g., picture information) may be modified or revised with facility.

DESCRIPTION OF THE PREFERRED EMBODIMENTS

In the following description of the preferred embodiments, the present invention is described with respect to the still video floppy disc systems.

Figure 1:
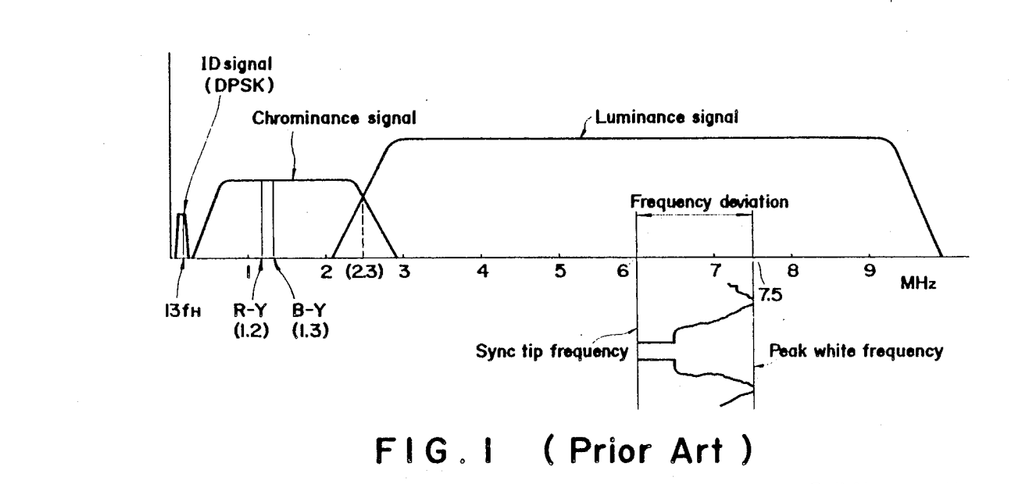
FIG. 1 is a frequency spectrum allocation diagram for recording signals of the still video floppy disk systems.

FIG. 1 is a frequency spectrum allocation diagram for recording signals of the still video floppy disk systems. The standardized recording format for the systems have been proposed by EIAJ (Electronic Industries Association of Japan). The luminance video signal is converted to a frequency-modulated signal for recording within a high frequency zone shown in FIG. 1. The chrominance signal components consist of a R−Y and a B−Y color difference signal which are combined alternately into a line-sequential chrominance signal. These signals shall be frequency-modulated first and then recorded with the FM luminance signal acting as bias, within a low frequency zone shown in FIG. 1. The center frequencies of the carriers of the R−Y and B−Y color difference signals are different from each other. The center frequencies and deviations of the R−Y and B−Y color difference signals are allocated as shown in FIG. 1. The identification (ID) codes or data associated with picture information are recorded using the frequency division multiplexing method. The ID code field/frame identification shall be recorded on the frame picture and need not always be recorded on the field picture. The carrier frequency of the multiplexed ID codes or data is 13 times the horizontal sync frequency. The differential phase shift keying (DPSK) modulation method is used. The coding rule is as follows:

If a "0" is to be recorded during a bit interval, it is recorded as a DPSK signal with the same phase as the previous bit. If a "1" is to be recorded, it is recorded with the opposite phase of the previous bit. For example, if the last phase recorded was $p_1$, then the bit sequence (1011) will be recorded as the phase sequence ($p_0$, $p_0$, $p_1$, $p_0$). The first bit requires an initial bit.

Figure 2:
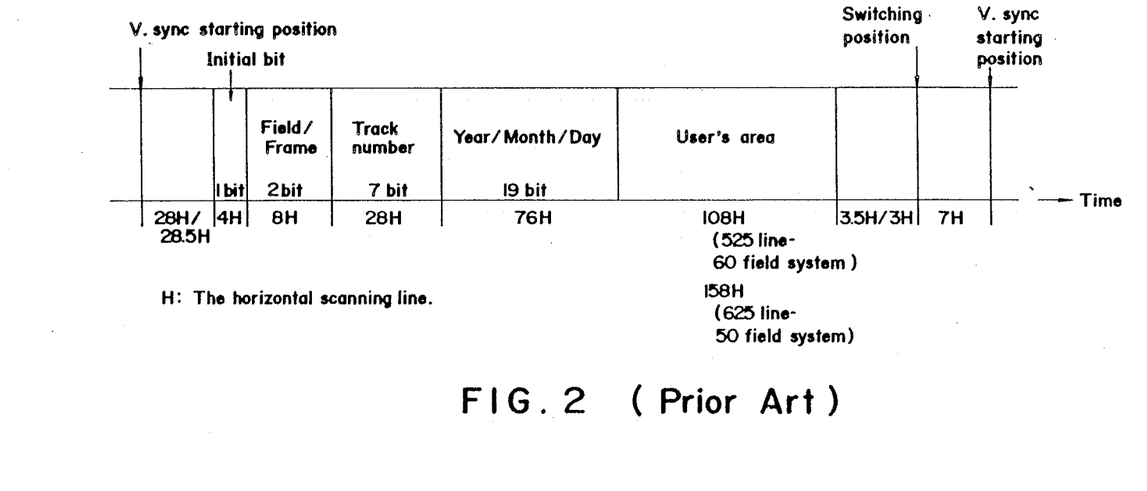
FIG. 2 is a bit allocation diagram for the ID codes or data in the video floppy disk systems.

FIG. 2 is a bit allocation diagram for the ID codes or data in the still video floppy disk systems. Four times the horizontal scanning line period shall correspond to the 1 bit interval except that in the user's area the 1 bit interval may correspond to two times the horizontal scanning period. The field/frame code indicates whether a track played back consists of a field picture or a frame picture, and uses 2 bits. An outer side track consists of a frame picture represented as "01", and an inner side track consists of a frame picture represented as "10". The track number consists of 7 bits and is expressed by a BCD code. For example, the 25th track is represented as "0100101". The year, month and day code consists of 19 bits and is expressed by a BCD code. The user's area has 108 times the horizontal scanning line for the 525 line-60 field system, or 158 times the horizontal scanning line for the 625 line-50 field system.

Figure 3:
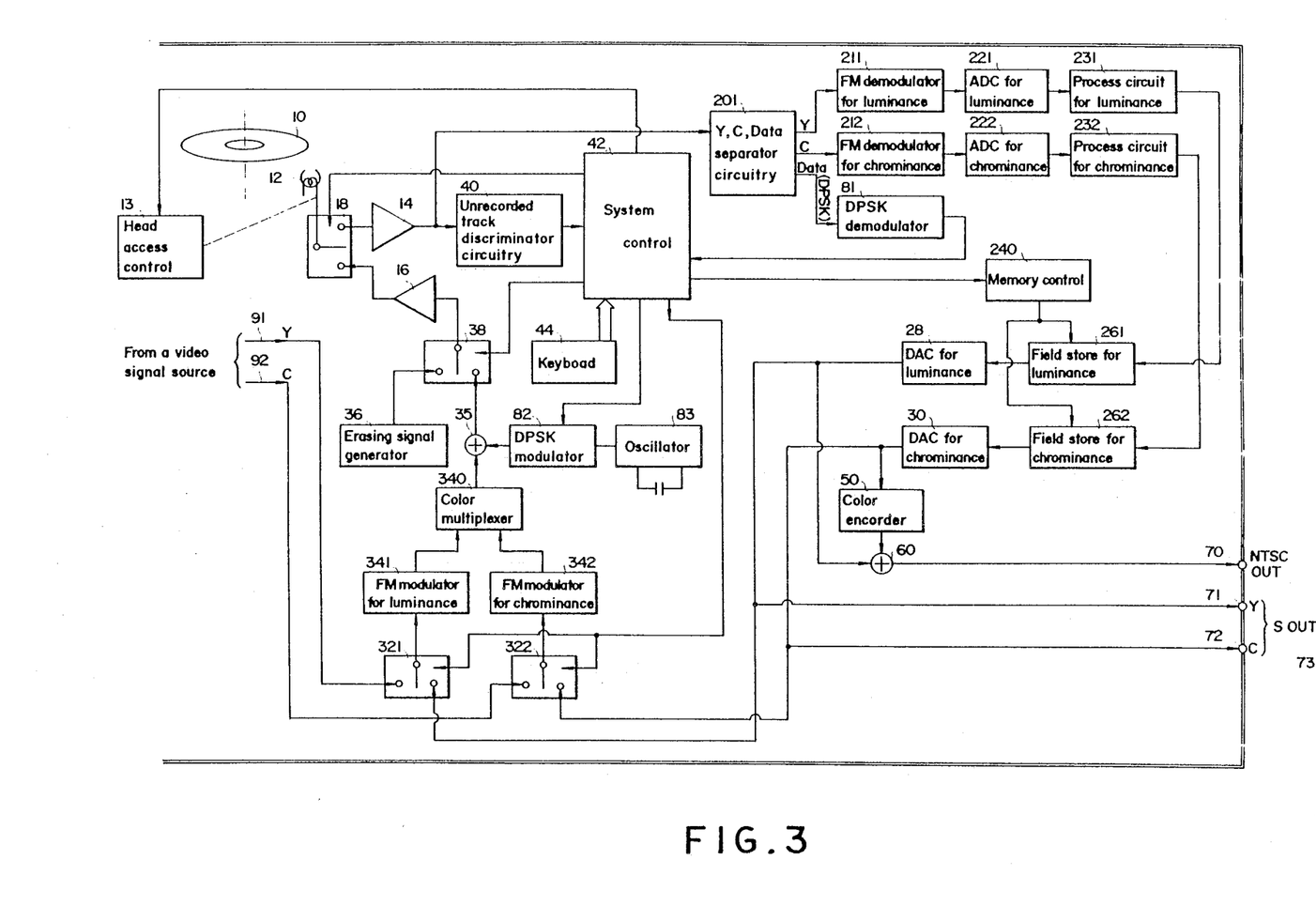
FIG. 3 is schematic diagram of a still video floppy disk system according to the present invention.

FIG. 3 is a schematic diagram of a still video floppy disk system according to the present invention. In FIG. 3, a floppy disk 10 as an information recording medium is rotationally driven at, for example, 3600 rpm by an electric motor (not shown). A magnetic head 12 for recording, reproducing or erasing information on the disk 10 is provided in such a manner that the head 12 can be driven by a head access control 13 well known in itself in this technical field.

A plurality of recording areas, that is, successive recording tracks are allocated on a recording surface of the floppy disk 10. The tracks are formed annularly with concentricity and numbered the first track (most outer track), the second track, the third track, ..., and the n-th track (most inner track) from the outer to inner side of the disk, defining an order of the information recording areas. Frequency-modulated picture signals with associated data signals as aforementioned with reference to FIGS. 1 and 2, representative of units of picture information, are recorded in the corresponding recording areas, that is, the recording tracks on the disk 10.

The head access control 13 comprising a driving circuitry and associated mechanisms shifts the head 12 so as to access an aimed recording track on the disk 10. A preamplifier 14 for boosting the output of the head 12, and a recording amplifier 16 for amplifying a signal to be supplied to the head 12 are provided respectively. The preamplifier 14 and the recording amplifier 16 are selectively connected to the head 12 through a changeover switch 18. A separator circuitry 201 for separating the luminance (Y), the chrominance (C) and the data is connected to the output terminal of the preamplifier 14. More strictly speaking, in this system, the luminance (Y) mentioned above is the luminance plus sync signal (Y+S), and the chrominance (C) is the line sequential color difference signals (R−Y and B−Y). The separated luminance (Y) is supplied to an analog-to-digital converter (ADC) 221 through an FM demodulator 211 for the luminance (Y). The separated chrominance (C) is supplied to an analog-to-digital converter (ADC) 222 through an FM demodulator 212 for chrominance (C). The separated data in the DPSK form is supplied to a DPSK demodulator 81 for converting the DPSK data to the former binary data.

A digitized luminance signal from the ADC 221 is supplied to a process circuit 231 for luminance, and a digitized chrominance signal from the ADC 222 is supplied to a process circuit 232 for chrominance. The process circuits 231 and 232 perform the skew compensation and the dropout compensation for the luminance signal and the chrominance signal, respectively. Outputs issued from the process circuits 231 and 232 are supplied to field stores 261 and 262 for luminance and chrominance, respectively. The field stores 261 and 262 are capable of storing field picture information which have been recorded in an annular recording track on the disk 10. The field stores 261 and 262 are controlled by a memory control 240 addressing the stores 261 and 262 for writing into or reading out information. The stored luminance signal is read out and supplied to a first input terminal of a changeover switch 321 through a digital-to-analog circuit (DAC) 28. The stored chrominance signal is read out and supplied to a first input terminal of a changeover switch 322 through a digital-to-analog circuit (DAC) 30. The output chrominance from the DAC 30 is also supplied to a color encoder 50 which includes a circuit for changing the line sequential color difference signals into concurrent signals. The encoded chrominance signal issued from the color encoder 50 and the output luminance signal issued from the DAC 28 are mixed by a mixer circuit 60 so as to form the NTSC composite video signal obtained at a NTSC output terminal 70. Also, the output of the DAC 28 for the luminance is conducted to a Y output terminal 71, and the output of the DAC 30 for the chrominance is conducted to a C output terminal 72. The terminals 71 and 72 form a so-called S output terminal 73 for reproducing a high quality picture. Further, the luminance signal issued from the DAC 28 is supplied to a color multiplexer 340 through the changeover switch 321 and an FM modulator 341 for luminance. Similarly, the chrominance signal issued from the DAC 30 is also supplied to the color multiplexer 340 through the changeover switch 322 and an FM modulator 342 for chrominance. The changeover switch 321 with its first input terminal connected to the DAC 28, with its second input terminal connected to a luminance signal line 91 from a video signal source (not shown) and with its common output terminal connected to the FM modulator 341 for luminance (Y), selectively supplies one of the two luminance signals to the FM modulator 342. The changeover switch 322 with its first input terminal connected to the DAC 30, with its second input terminal connected to a chrominance signal line 92 from the video signal source and with its common output terminal connected to the FM modulator 342 for chrominance (C), selectively supplies one of the two chrominance signals to the FM modulator 342. The aforementioned video signal source (left verge of FIG. 3) may be a system such as a still video camera circuitry, a video camera, a video cassette recorder, a video disk player, or a transmission channel for video information.

Both outputs issued from the FM modulators 341 and 342 are supplied to a color multiplexer 340. The color multiplexer 340 multiplexes chrominance with luminance. The multiplexed color video signal issued from the color multiplexer 340 is supplied to the magnetic head 12 through a mixer circuit 35, a changeover switch 38, the recording amplifier 16 and the changeover switch 18. A first input terminal of the changeover switch 38 is connected to an output terminal of the mixer circuit 35, and its second input terminal is connected to an output terminal of an erasing signal generator 36 for supplying an erasing signal or current to the head 12 through the switch 38 and the amplifier 16 while erasing operation is being executed in this system. A common output terminal of the switch 38 is connected to an input terminal of the amplifier 16.

On the other hand, the aforementioned output video signal issued from the preamplifier 14 is also supplied to an unrecorded track discriminator circuitry 40. The unrecorded track discriminator circuitry 40 discriminates unrecorded tracks from recorded tracks on the basis of an envelope level of the output signal of the preamplifier 14 while the head 12 accesses an aimed track, and issues a resultant discrimination signal to be supplied to a system control 42.

The system control 42 comprises a microprocessor and supplies control signals to the head access control 13, the changeover switches 18, 38, 321 and 322, and the memory control 240 so as to generally control this system complying with an operation at a keyboard 44 connected therewith. The aforementioned demodulated data in the binary form issued from the DPSK demodulator 81 is supplied to the system control 42 and stored in a storage provided therein. The stored data may be modified or revised automatically or complying with operations at the keyboard 44. The data stored in the system control 42 is read out and supplied to a DPSK modulator 82 which receives a carrier from an oscillator 83 and forms a DPSK data signal corresponding to the binary data supplied. The data in the DPSK form issued from the DPSK modulator 82 is mixed or multiplexed with the colorplexed video signal issued from the color multiplexer 340 in the mixer circuit 35 so as to supply the multiplexed video signal with the DPSK data to the head 12 via the switch 38, the amplifier 16 and the switch 18.

Figure 4:
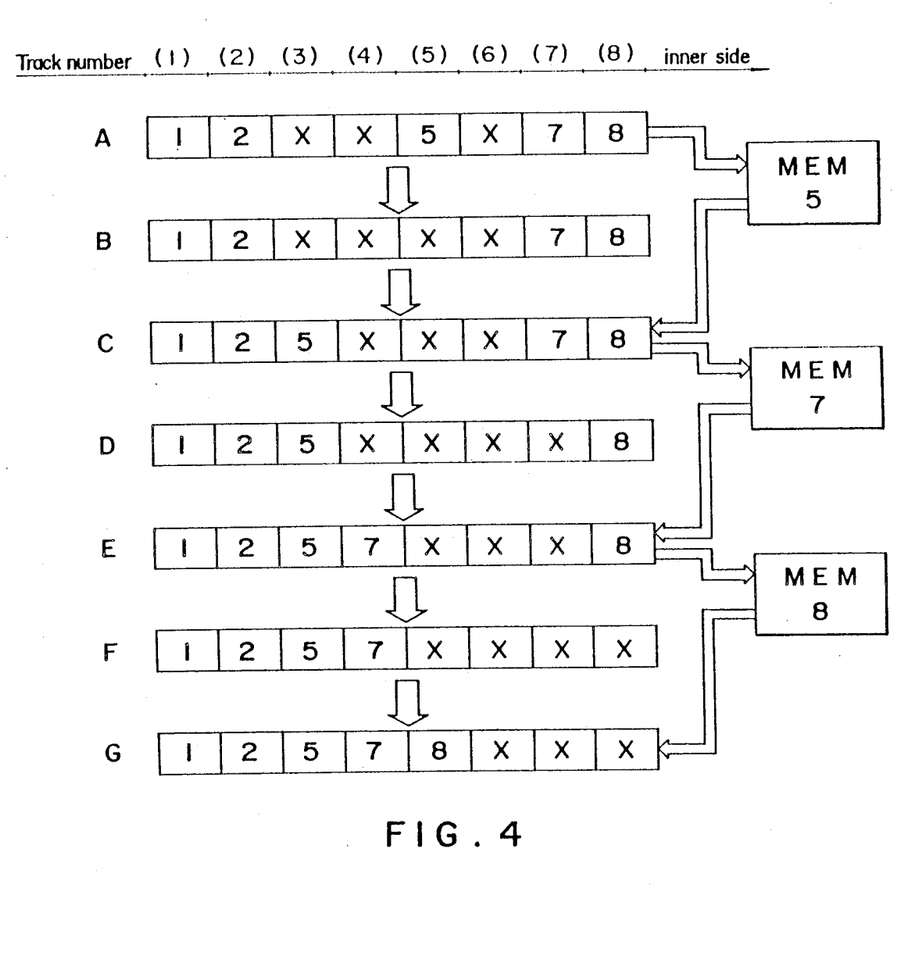
FIG. 4 is an illustrative diagram depicting a rearranging operation for the locations of information units in a still video floppy disk system according to an embodiment of the invention.

FIG. 4 is an illustrative diagram depicting a rearranging operation for the locations of information units in a still video floppy disk system according to an embodiment of the invention. In the embodiment, information units, that is, units of field picture information are rearranged in such a manner that recorded areas (i.e., tracks) are consecutively allocated from a relatively preceding area, that is, the most outer track (No. 1) maintaining the order of the prerecorded area in the former state, thereby excluding unrecorded areas from the consecutive recorded areas.

In FIG. 4, for convenience sake, the diagram is depicted on the assumption that eight recording tracks are located on the recording medium (i.e., floppy disk), and the tracks are numbered the first, second, ..., and eighth, respectively, from the most outer track (i.e., the first track) to the most inner track. In the real system, according to the standard specification proposed by EIAJ, the first through 50th tracks are allocated as main tracks. Video signals can be recorded on the main tracks. A cue track is provided at the 52nd track. No signal shall be recorded on the 51st track. In this embodiment, the editing operation is performed to the main tracks. In FIG. 4, the respective track numbers are designated by parenthesized numbers (1), (2), ..., (7) and (8). Square frame trains each including eight frames show the positional order of the recorded information. Each frame corresponds to a recording area to be allocated on the recording medium, and each number in these frames represents a information unit corresponding to a field picture previously numbered.

In the square frame train marked A, the track numbers coincide with the information numbers. The mark "X" represents an unrecorded area. Namely, in the state of frame train A, information "1" is recorded in the first track, information "2" is recorded in the second track, information "5" is recorded in the fifth track, information "7" is recorded in the seventh track, and information "8" is recorded in the eighth track. Further, the tacks 3, 4 and 6 are unrecorded. The rectangular frame labeled "MEM" and the number therein correspond to a temporary storage means for evacuating the aimed information unit from the recording area, and the information stored therein, respectively. In the system of FIG. 3, the temporary storage means is formed by the field stores 261 and 262, and associated circuits.

In the location state depicted in square frame train A, information "5" is evacuated from the recording area (i.e., the fifth track) and stored in the temporary storage. Subsequently, the fifth track is placed under the erasing operation. In the evacuating operation mentioned above, the fifth track, where information "5" to be evacuated is recorded, is positioned immediately after the last (i.e., the fourth track) of the most preceding consecutive unrecorded areas (i.e., the third and fourth tracks). In this embodiment, a track where the information to be evacuated is recorded is determined in a similar way in each case. Now, the location state is changed into a state depicted in square frame train B. Then, information "5" is read out from the temporary storage means and recorded in third track which is the first of the preceding unrecorded areas with respect to the order of the successive recording areas, that is, the first, second, ..., and eighth tracks on the disk. Therefore, the state of B is changed to the state of C. In the state of C, information "7" is evacuated from the seventh track and stored in the temporary storage. Then, the erasing operation is executed for the seventh track, the evacuated information "7" is recorded in the fourth track as shown in the diagram, and the location state is changed from C to E through D. The relocation of the information is similarly performed for information "8" formerly recorded in the eighth track. Resultantly, the positional arrangement of information is brought to state G through state F.

Referring to the square frame train marked G in FIG. 4, it can be clearly recognized that the resultant allocation for the information recording areas is such that the recorded areas (i.e., the first to fifth tracks) are consecutively allocated without including the unrecorded areas "X", "X", from a relatively preceding area (the first, most outer track in this case) formerly allocated on the information recording medium (i.e., floppy disk), maintaining the order (1→2→5→7→8) of the prerecorded areas in the former state (A). Thus, the pickup head means or reproducing means need not skippingly scan the successive recorded areas (tracks) for promptly playing back the information.

Once the recorded tracks are consecutively rearranged as abovementioned, the remaining capacity of the disk 10 may be detected without scanning all of the tracks, on the assumption that all remaining tracks following the unrecorded track of first occurrence (i.e., the most outer unrecorded track) are in the unrecorded state. Thus, the remaining capacity of the disk may be promptly detected in this system without actually scanning all unrecorded tracks remaining thereon.

In the aforementioned operation, the data associated with the respective picture information is played back and separated by the separator circuitry 201 (see FIG. 3) and once stored in the storage in the system control 42 before the information to be evacuated is stored in the temporary storage means, that is, the field stores 261 and 262. Then, the data information is mixed or multiplexed with the picture information so as to be recorded therewith in a renewal of the track. The data may be modified or revised via the system control 42 as occasion demands. For example, the track number data or year/month/day data as shown in FIG. 2 may be revised. Thus, the correspondence between the information and the associated data may be maintained even if the information is relocated.

Now, the operation of the system of FIG. 3 wherein the system acts to perform the function illustrated in FIG. 4 will be described below with reference to FIG. 5.

Figure 5:
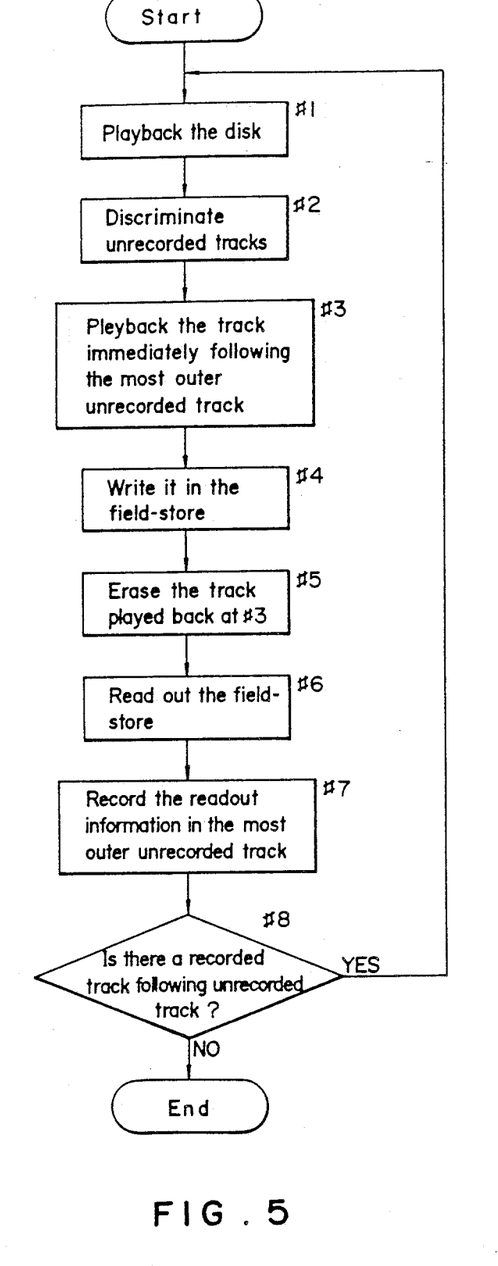
FIG. 5 is a flow chart graphically representing a sequential operation or routine for a function illustrated in FIG. 4.

FIG. 5 is a flow chart graphically representing a sequential operation or routine for a function illustrated in FIG. 4.

At first, the magnetic head 12 is shifted in the radial direction of the disk 10 from track to track by the head access control 13 on the basis of the control signal from the system control 42 which acts responding to an operation at the keyboard 44 connected therewith, and the head 12 plays back the recorded information from all of the respective tracks on the disk 10 (FIG. 5, #1).

The played back information (signal) are supplied to the unrecorded track discriminator circuitry 40. The discriminator circuitry 40 discriminates unrecorded tracks from the recorded tracks on the basis of an envelope level of the output signal of the preamplifier 14 while the head accesses an aimed track, and supplies a resultant discrimination signal to the system control 42. Therefore, the resultant discrimination data for distinction between the recorded tracks and the unrecorded tracks with respect to all of the tracks is stored in a storage of the system control 42 (FIG. 5, #2).

Then, on the basis of the resultant discrimination data stored in step #2, the system control 42 detects a recorded track which is located immediately after the last of the most preceding (i.e., outer) consecutive unrecorded tracks, and plays back the detected track (FIG. 5, #3).

The system control 42 stores information reproduced from the detected track in step #3 into the field stores 261 and 262 as the temporary storage means (FIG. 5, #4).

The operation of this system in step #4 will be described in detail below.

The head 12 picks up information from the detected track (in step #3) and supplies an output signal for the information to the preamplifier 14 through the changeover switch 18. Then, the preamplifier 14 issues an output signal which is a DPSK data multiplexed FM video signal mentioned with reference to FIG. 1, and supplies it to the separator circuitry 201. The separator circuitry 201 separates the input video signal into luminance (Y), chrominance (C) and DPSK data. The luminance (Y) is supplied to the field store 261 via the FM demodulator 211, the analog-to-digital converter 221 and the process circuit 231. Similarly, the chrominance (C) is supplied to the field store 262 via the FM demodulator 212, the analog-to-digital converter 222 and the process circuit 232. Then, the luminance (Y) and the chrominance (C) are written into the field stores 261 and 262, respectively. The writing and reading of digital information for luminance or chrominance into and out of the field store 261 or 262 is controlled by the memory control 240 in response to a control signal from the system control 42. On the other hand, the separated DPSK data issued from the separator circuitry 201 is demodulated into the former binary data via the DPSK demodulator 81 and written into the storage provided in the system control 42.

After step #4 mentioned above is performed, the recorded area (track) from which the recorded information is evacuated to the temporary storage means 261 and 262, is placed under the erasing operation (FIG. 5, #5). The erasing operation is executed as follows: the erasing signal issued from the erasing signal generator 36 is supplied to the head 12 via the changeover switch 38, the amplifier 16 and the changeover switch 18. Of course, in this step #5, the connections of the changeover switches 38 and 18 are changed to hold the channel for the erasing signal flowing therethrough.

Then, the information stored in the temporary storage means 261 and 262 is read out by the memory control 240 (FIG. 5, #6).

The read out information is recorded in a relocated area (track) which is the most preceding unrecorded area (i.e., the most outer unrecorded track) (FIG. 5, #7).

The operation of this system in step #7 is performed as follows:

The head 12 is shifted to the most preceding unrecorded area (i.e., the most outer unrecorded track) by the driving operation of the head access control 13 in response to the control signal from the system control 42.

The read out luminance from the field store 261 is fed to the first input terminal of the color multiplexer 340 via the digital-to-analog converter 28, the changeover switch 321 and the FM modulator 341 for luminance. Similarly, the read out chrominance from the field store 262 is fed to the second input terminal of the color multiplexer 340 via the digital-to-analog converter 30, the changeover switch 322 and the FM modulator 342 for chrominance. The color multiplexer 340 multiplexes the fed chrominance with the fed luminance and forms the colorplexed video signal in the FM form.

On the other hand, the demodulated data which have been once stored in the storage of the system control 42 as mentioned above is read out and fed to the DPSK modulator 82. The data may be previously revised via the system control 42, as mentioned above. The DPSK modulator 82 forms a DPSK data signal by modulating a carrier supplied from the oscillator 83 on the basis of the output data signal from the system control 42. The colorplexed video signal in FM form issued from the color multiplexer 340 and the DPSK data signal issued from the DPSK modulator 82 are mixed in the mixer circuit 35 so as to form a DPSK data multiplexed or mixed video signal (FM). More strictly, in this embodiment, the mixed video signal is the frequency division multiplexed signal as previously described for FIGS. 1 and 2. The multiplexed FM signal issued from the mixer circuit 35 is fed to the head 12 via the changeover switch 38, the recording amplifier 16 and the changeover switch 18. Of course, the connections of the changeover switches 321 and 322 are changed to hold the conduction between the digital-to-analog converters 28 and 30 and the FM modulators 341 and 342, respectively, in response to the control signals from the system control 42. Simultaneously, the connections of the changeover switches 38 and 18 are changed to hold the transmission for the multiplexed video signal to be fed to the head 12, also in response to the control signals from the system control 42. Then, the system control 42 revises the aforementioned discrimination data for distinction between the recorded tracks and the unrecorded tracks with respect to all of the tracks, corresponding to the erasing operation and rerecording operation in steps #5 and #7.

The system control 42 judges whether there is any recorded area (track) following an unrecorded area or not (FIG. 5, #8). If a recorded area remains, the operations of steps #1 to #8 are cyclically repeated. On the other hand, if no recorded area remains, the self-editing operation of this system is completed.

In the system of FIG. 3, the circuitry provided for evacuating an information unit is formed by digitized circuits so that the deterioration of the quality of information caused by rerecording may be suppressed to a minimum. Color video information once stored in the field stores 261 and 262 may be displayed on a video monitor (not shown) connected to the NTSC output terminal 70 or the S output terminal 73, continuously by repeatedly reading out the field stores 261 and 262 even if the disk rotation is stopped.

Further, a video signal from the video signal source outside of this system may be recorded on the disk 10. Moreover, once the discrimination data for the distinction between the recorded tracks and the unrecorded tracks are obtained by scanning all of the tracks with the head 12 and stored in the storage of the system control 42, the discrimination data may be revised afterward corresponding to the relocation or rearrangement of information without rescanning all of the tracks.

Figure 6:
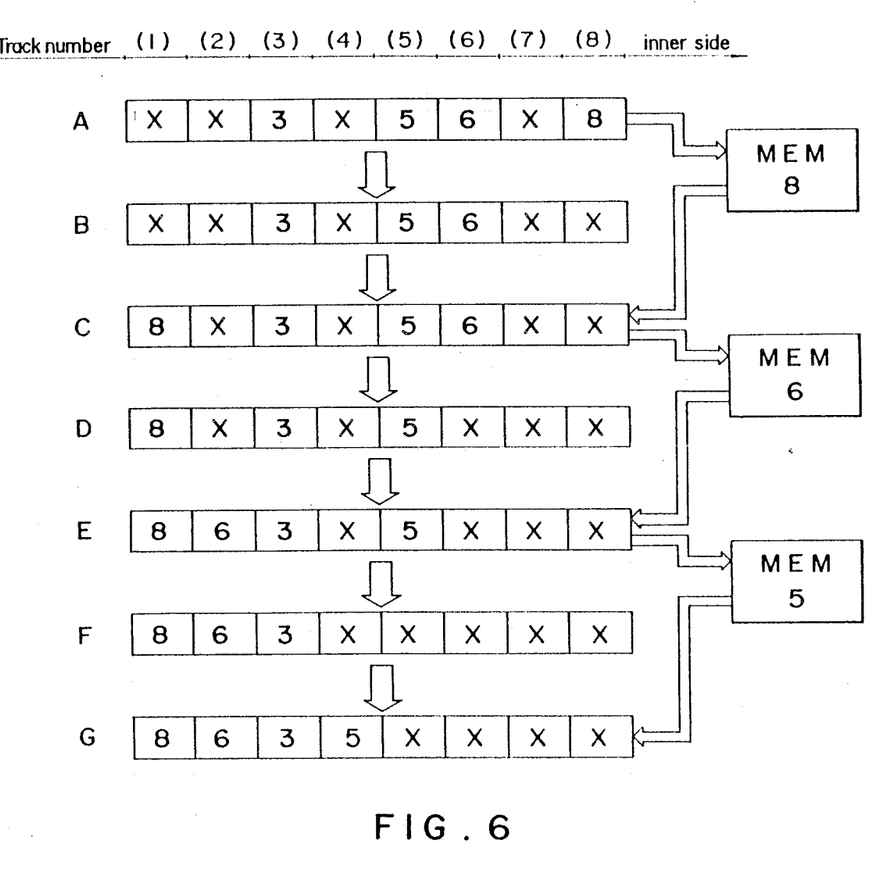
FIG. 6 is an illustrative diagram depicting a rearranging operation for the locations of information units in a still video floppy disk system according to another embodiment of the invention.

FIG. 6 is an illustrative diagram depicting a rearranging operation for the locations of information units in a still video floppy disk system according to another embodiment of the invention. The corresponding block diagram of this embodiment system is also shown in FIG. 3. In this embodiment, information units, that is, units of field picture information are rearranged in such a manner that recorded areas (i.e., tracks) are consecutively allocated from a relatively preceding area, that is, the most outer track (No. 1) thereby excluding unrecorded area from the consecutive recorded areas, and that the information recorded in the last positioned area (i.e., the most inner recorded track) is relocated to the most preceding unrecorded area (i.e., the most outer unrecorded track) so that the deterioration of the quality of information caused by rerecording may be suppressed to a minimum. In FIG. 6, the diagram is depicted on the assumption that eight recording tracks are located on the recording medium, for convenience sake, in the same way as mentioned for FIG. 4. The same symbolic illustrating manner as in FIG. 4 is also applied to FIG. 6.

In the evacuating operation, an information unit (i.e., multiplexed field picture information) which is in the last positioned recorded area (i.e., the most inner recorded track) among the prerecorded areas is evacuated from the area and stored in the temporary storage means.

In the location state depicted in square frame train A, information "8" is evacuated from the recording area (i.e., the eighth track) and stored in the temporary storage. Subsequently, the eighth track is placed under the erasing operation, and the location state is changed into a state depicted in square frame train B. Then, information "8" is read out from the temporary storage means and recorded in the first track which is the most preceding unrecorded area with respect to the order of the successive recording areas, that is, the first, second, eighth tracks on the disk. Therefore, the location state is changed from B to C. In state C, information "6" is evacuated from the sixth track and stored in the temporary storage. Then, the erasing operation is executed for the sixth track. Further, the evacuated information "6" is recorded in the second track, as shown in the diagram. Namely, the location state is changed from C to E through D. The relocation or rearrangement of information is similarly performed for information "5" formerly recorded in the fifth track. Resultantly, the positional arrangement of information is brought to state G through state F. Referring to the square frame train marked G in FIG. 4, it can be clearly recognized that the resultant allocation for the information recording areas is such that the recorded areas (i.e., the first to fourth tracks) are consecutively allocated without including the unrecorded areas "X", "X", from a relatively preceding area (the first, most outer track in this case) formerly allocated on the information recording medium (i.e., floppy disk). Thus, the pickup head means or reproducing means need not skippingly scan the successive recorded areas (tracks) to promptly play back information. In the aforementioned operation, the data associated with the respective picture information (i.e., main information) is played back and separated from the picture information by the separator circuitry 201 (see FIG. 3) and once stored in the storage provided in the system control 42 before the main information to be evacuated is stored in the temporary storage means, that is the field stores 261 and 262. Then, the data is mixed or multiplexed with the main information so as to be recorded therewith in a renewal of the track. The data may be modified or revised via the system control 42 as occasion demands. For example, the track number data or year/month/day data as shown in FIG. 2 may be revised. Thus, the correspondence between the main information and the associated data may be maintained even if the information is relocated.

Figure 7:
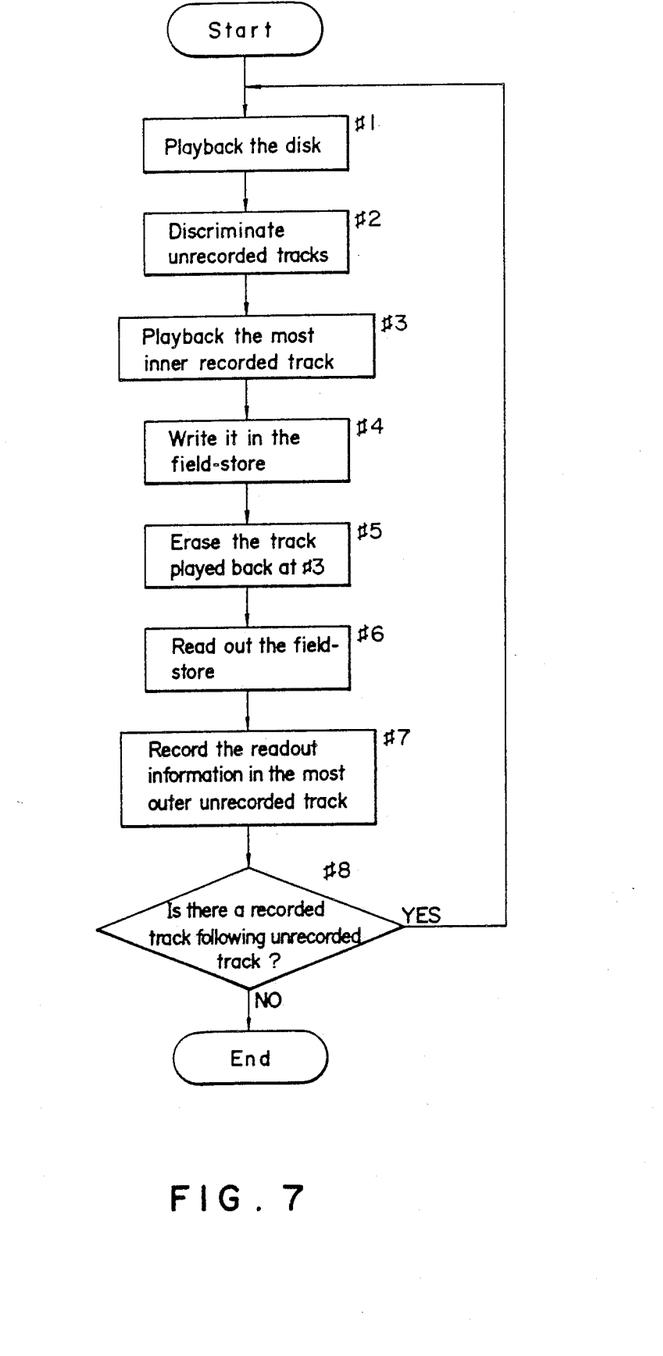
FIG. 7 is a flow chart graphically representing a sequential operation or routine for a function illustrated in FIG. 6.

The operation of the system of FIG. 3 wherein the system acts to perform the function illustrated in FIG. 6 is represented in FIG. 7.

FIG. 7 is a flow chart graphically representing a sequential operation or routine for a function illustrated in FIG. 6.

It will be easily understood that the difference between the operations of FIG. 7 and FIG. 5 is only step #3. Remaining operation steps of FIG. 7 are the same as that of FIG. 5 mentioned above. Therefore, only the difference will be described below. In step #3 of FIG. 7, on the basis of the resultant discrimination data obtained in step #2, the system control 42 detects a recorded track last positioned among the prerecorded tracks, and plays back the detected track. Of course, the head 12 is previously shifted to the track for playback, by the head access control 13 in response to the control signal supplied from the system control 42. In the operating steps in FIG. 7, the modification or revision of the data associated with the main information (i.e., picture information) is performed in the same way as mentioned for FIGS. 4 and 5. The key feature of the embodiment aforementioned with reference to FIGS. 6 and 7 is that the information in a relatively inner track is relocated to a relatively outer track, more particularly, more inner track information is relocated to a more outer track. Therefore, the deterioration of the quality of information caused by recording and/or playing back the information may be suppressed to a minimum for relatively inner tracks where the relative speed of the transducer head with respect to the medium (i.e., disk) is relatively low thereby bringing an inferior condition for the transducing of the transducer head.

The still video floppy disk system of FIG. 3 is built into a single housing and may be forms, for example, an electronic still camera by providing a camera circuitry (not shown) to be connected to the signal channels 91 and 92. On the other hand, the still video floppy disk system of the invention may be built into separate housings as shown in FIG. 8.

Figure 8:
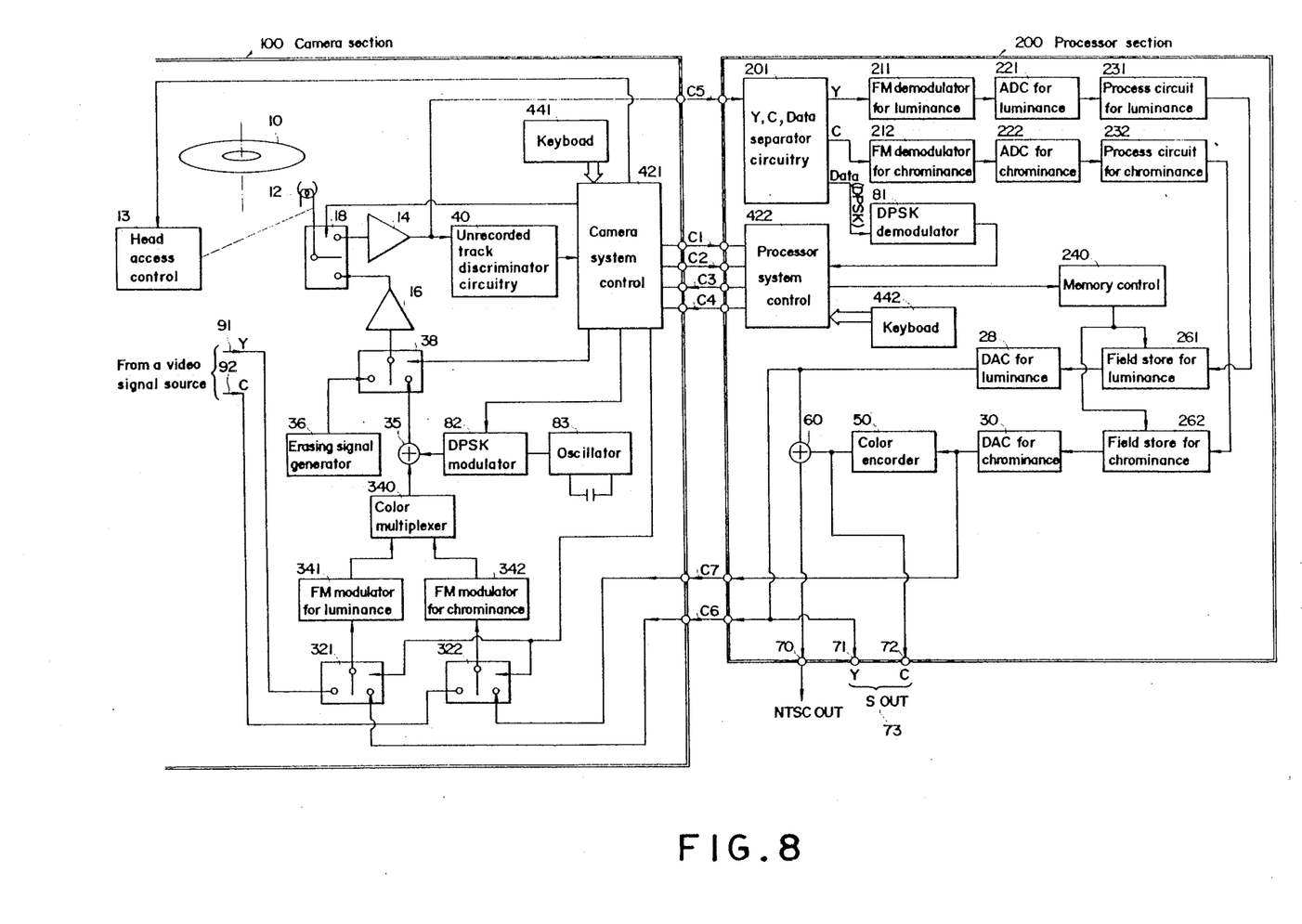
FIG. 8 is a schematic diagram of a still video floppy disk system according to another embodiment of the invention.

FIG. 8 is a schematic diagram of a still video floppy disk system according to another embodiment of the invention.

In FIG. 8, elements corresponding to those of the system in FIG. 3 are assigned the same numerical symbols, and the description for these elements are omitted. The system of FIG. 8 is separately built into a camera section 100 and a processor section 200. These housings are independently formed and can be detachably connected by conductors C1, C2, C3, C4, C5, C6 and C7.

The camera section 100 is generally controlled by a camera system control 421 and the processor section 200 is generally controlled by a processor system control 422. The camera system control 421 is responsive to operations at a keyboard 441. Similarly, the processor system control 422 is responsive to operations at a keyboard 442. Both system controls 421 and 422 are connected with the conductors C1, C2, C3 and C4 as signal channels so as to perform data communication on the basis of a predetermined communication protocol. Thus, both system controls 421 and 422 act in cooperation with each other so as to function like the system control 42 in FIG. 3 at least in certain time intervals. An output video signal issued from a preamplifier 14 in the camera section 100 is supplied to a separator circuitry 201 in the processor section 200 through the conductor C5 and subsequently processed in the same way as in the system of FIG. 3. An output luminance signal issued from a digital-to-analog converter 28 in the processor section 200 is transmitted to a changeover switch 321 in the camera section 100 through the conductor C6. Similarly, an output chrominance signal issued from a digital-to-analog converter 30 in the processor section 200 is transmitted to a changeover switch 322 in the camera section 100 through the conductor C7. The transmitted luminance and chrominance signals are rerecorded on a disk 10 in the same way as in the system of FIG. 3. The system of FIG. 8 can function as illustrated in FIGS. 4 to 7. In the system of FIG. 8, the camera section 100 may be built in a very small-sized housing so that the system has the advantage of superior handling for taking a picture, utilizing the camera section 100 independent of the processor section 200. In the editing operation mode of the system, the camera section 100 and the processor section 200 are connected with each other as shown in FIG. 8, and the processor system control 422 acts as a master control and the camera system control 421 acts as a slave control.

What is claimed is:

1. An editing system for rearranging a location of information units recorded in successive recording areas allocated in a predetermined positional order on an information recording medium to be applied to a recording and/or reproducing apparatus, said editing system comprising:

discriminating means for discriminating unrecorded areas on the information recording medium based on the playback operation for the medium to obtain a discrimination result;

erasing means for carrying out an erasing operation for a specific area of said successive recording areas allocated on the information recording medium;

temporary storage means for temporarily storing an information unit recorded in said specific area to be placed under the erasing operation of said erasing means, before the commencement of the erasing operation;

rerecording means for recording the information unit temporarily stored in said temporary storage means, in an area of said successive recording areas allocated on the information recording medium, other than the area where the information unit to be rerecorded is formerly recorded; and system control means for receiving the discrimination result of said discriminating means and controlling the editing operation of said editing system by successively activating said erasing means, temporary storage means and rerecording means in a regular sequence, thereby rearranging the location of the information units recorded on the information recording medium applied.

2. An editing system in accordance with claim 1, wherein said system control means provides the regular sequence for the editing operations of said system which comprises the steps of:
(a) evacuating an information unit from the prerecorded area positioned immediately after the last of the most preceding consecutive unrecorded areas with respect to the order of said successive recording areas allocated on the information recording medium, by storing the information to be evacuated in said temporary storage means;
(b) carrying out the erasing operation of said erasing means for the prerecorded area where the evacuated information is formerly recorded; and
(c) reading out the information from said temporary storage means and recording it in the most preceding unrecorded area in the order of said successive recording areas allocated on the information recording medium;
said steps being cyclically repeated, if necessary, so as to rearrange the location of the information units recorded in said successive recording areas, thereby bringing about a revised arrangement in which information recorded areas are consecutively allocated to exclude unrecorded areas from the consecutive recorded areas, from a relatively preceding area formerly allocated on the information recording medium, maintaining the order of the prerecorded areas in the former state.

3. An editing system in accordance with claim 1, wherein said system control means provides the regular sequence for the editing operation of said system which comprises the steps of:
(a) evacuating an information unit from the prerecorded area last positioned among the prerecorded areas with respect to the order of said successive recording areas allocated on the information recording medium, by storing the information to be evacuated in said temporary storage means;
(b) carrying out the erasing operation of said erasing means for the prerecorded area where the evacuated information is formerly recorded; and
(c) reading out the information from said temporary storage means and recording it in the most preceding unrecorded area in the order of said successive recording areas allocated on the information recording medium;
said steps being cyclically repeated, if necessary, so as to rearrange the location of the information units recorded in said successive recording areas, thereby bringing about a revised arrangement in which information recorded areas are consecutively allocated to exclude unrecorded areas from the consecutive recorded areas, from a relatively preceding area formerly allocated on the information recording medium.

4. An editing system in accordance with claim 1, 2 or 3, wherein said system is adapted to process multiplexed video information including picture information and supplementary information associated with the picture information, said system further comprising:
separating means for separating the picture information and the supplementary information at a position before said temporary storage means;
supplementary storage means for storing the supplementary information separated by said separating means;
modifying means capable of modifying the supplementary information stored in said supplementary storage means; and
multiplexing means for multiplexing the picture information supplied from said temporary storage means and the supplementary information supplied through said modifying means, so as to supply resultant multiplexed information to said rerecording means.

5. An editing system in accordance with claim 1, 2 or 3, wherein said system comprises driving means for driving a rotary magnetic disk to be applied as the information recording medium.

6. An editing system in accordance with claim 4, wherein said system comprises driving means for driving a rotary magnetic disk to be applied as the information recording medium.

7. An editing system in accordance with claim 1, 2 or or 3, wherein said temporary storage means comprises a digital fieldstore.

8. An editing system in accordance with claim 5, wherein said temporary storage means comprises a digital fieldstore.

9. An editing system in accordance with claim 1, 2 or 3, wherein a single head means is applied for reproducing from the information recording medium information the location of which is to be rearranged, for erasing the information by acting as an element of said erasing means and further for recording the information by acting as an element of said rerecording means.

10. An editing system in accordance with claim 4, wherein a single head means is applied for reproducing from the information recording medium information the location of which is to be rearranged, for erasing the information by acting as an element of said erasing means and further for recording the information by acting as an element of said rerecording means.

11. An editing system in accordance with claim 1, 2 or 3, wherein said system is separately built into a camera section and a processor section, said camera section functions as a camera as it is, utilizing a rotary magnetic disk to be applied as the video information recording medium, and said processor section includes said temporary storage means.

12. An editing system in accordance with claim 4, wherein said system is separately built into a camera section and a processor section, said camera section functions as a camera as it is, utilizing a rotary magnetic disk to be applied as the video information recording medium, and said processor section includes said temporary storage means.

13. An editing system in accordance with claim 11, wherein each of said camera section and said processor section has said system control means for controlling a system within the respective sections.

14. An editing system in accordance with claim 13, both system control means coact with each other to perform data communication on the basis of a predetermined protocol in the editing operation mode of said editing system.

* * * * *